(12) United States Patent
Taxis

(10) Patent No.: US 7,035,720 B2
(45) Date of Patent: Apr. 25, 2006

(54) IN-CAR COMPUTER SYSTEM AND METHOD FOR SELECTING AND ACTIVATING OPTION MENUS

(75) Inventor: Heiko Taxis, Karlsbad (DE)

(73) Assignee: Harman / Becker Automotive Systems GmbH, Karlsbad (DE)

( * ) Notice: Subject to any disclaimer, the term of this patent is extended or adjusted under 35 U.S.C. 154(b) by 37 days.

(21) Appl. No.: 10/706,725

(22) Filed: Nov. 12, 2003

(65) Prior Publication Data

US 2004/0143372 A1    Jul. 22, 2004

(30) Foreign Application Priority Data

Nov. 13, 2002   (DE) ................................ 102 52 688

(51) Int. Cl.
*G06F 3/02* (2006.01)

(52) U.S. Cl. ............................... 701/1; 701/35; 701/36; 715/829; 715/841

(58) Field of Classification Search .................... 701/1, 701/35, 36; 345/184, 156, 172; 715/811, 715/818, 819, 827, 700, 830, 841, 854, 829
See application file for complete search history.

(56) References Cited

U.S. PATENT DOCUMENTS

| | | | | |
|---|---|---|---|---|
| 5,270,689 A | * | 12/1993 | Hermann ..................... 345/157 |
| 5,396,264 A | * | 3/1995 | Falcone et al. .............. 715/811 |
| 5,774,828 A | | 6/1998 | Brunts et al. ................. 345/169 |
| 5,821,935 A | * | 10/1998 | Hartman et al. ............. 715/839 |
| 6,011,546 A | * | 1/2000 | Bertram ....................... 715/700 |
| 6,104,399 A | * | 8/2000 | Volkel ......................... 715/841 |
| 6,757,594 B1 | * | 6/2004 | Weimper et al. ................ 701/1 |
| 2001/0015721 A1 | | 8/2001 | Byun et al. .................. 701/210 |
| 2004/0001105 A1 | * | 1/2004 | Chew et al. ................. 345/817 |

FOREIGN PATENT DOCUMENTS

| | | |
|---|---|---|
| DE | 199 41 973 A1 | 5/2001 |
| DE | 100 32 375 A1 | 1/2002 |
| DE | 100 44 819 A1 | 4/2002 |
| DE | 100 50 223 A1 | 4/2002 |
| DE | 102 03 559 A1 | 8/2002 |
| DE | 101 21 685 A1 | 11/2002 |

* cited by examiner

*Primary Examiner*—Tan Q. Nguyen
(74) *Attorney, Agent, or Firm*—Harness, Dickey & Pierce, P.L.C.

(57) ABSTRACT

The present invention relates to an in-car computer system which comprises a control device 12 for displaying a main menu and plural sub-menus, each containing at least one selectable menu item, an operating unit 12 for selecting and activating a menu item within the main menu or sub-menu, and a switching member 20. A repeated operation of the switching member 20 causes the control device to activate the individual menu items HM1–HM4 of the main menu in a predetermined order.

14 Claims, 1 Drawing Sheet

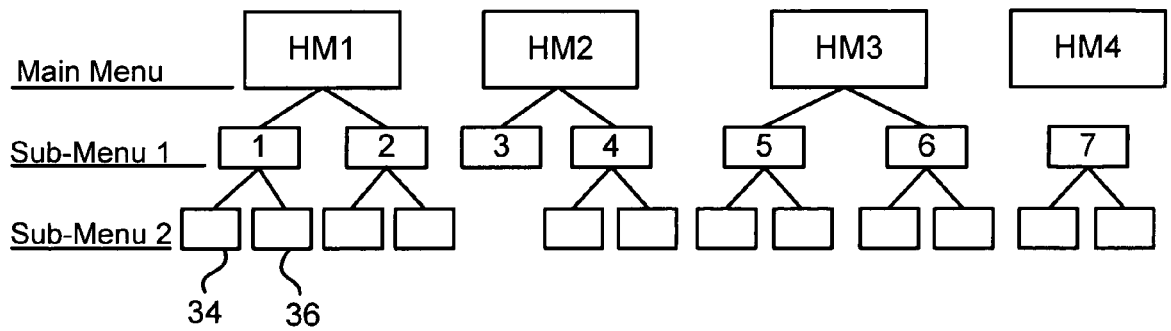
Fig. 1
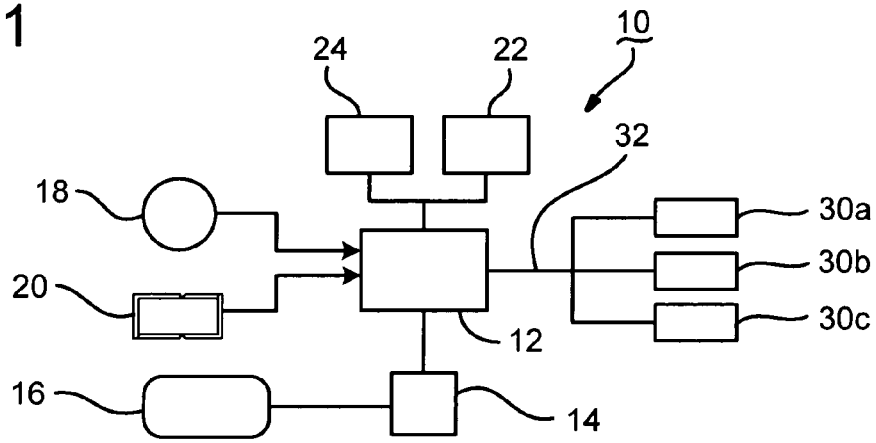
Fig. 2
|  | 1x | 2x | 3x | 4x |
|---|---|---|---|---|
| Standard | 1, 2 | 3, 4 | 5, 6 | 7 |
| Frequency | 3, 4 | 1, 2 | 7 | 5, 6 |
| Individ. | 1, 2 | 7 | 5, 6 | 3, 4 |
Fig. 3

IN-CAR COMPUTER SYSTEM AND METHOD FOR SELECTING AND ACTIVATING OPTION MENUS

CROSS-REFERENCE TO RELATED APPLICATION

This application claims priority of German patent application DE 102 52 688.5, filed on Nov. 13, 2002.

BACKGROUND OF THE INVENTION

The present invention relates to an in-car computer system comprising a control device for displaying a main menu and plural sub-menus, each containing at least one selectable menu item, and an operating unit for selecting and activating a menu item within the main menu or sub-menu. Further, the present invention relates to a method for selecting and activating option menus in an in-car computer system.

In-car computer systems of the aforementioned kind are generally known. The applicant for example offers a system called "CarPC" which allows to control a plurality of functions within a vehicle. The range of functions of such an in-car computer system does not only include the operation or control of audio sources and the navigation system, but also communication units like telephone, Internet etc. or classical vehicle-specific functions like air conditioning, seat adjustment, etc.

The in-car computer system comprises a display (monitor) for operating these functions, on which option menus may be displayed and which allows activation of individual functions by selecting the menus. The option menus are generally structured hierarchically and generally comprise one main menu level and one or more sub-menu levels. The main menu as well as the sub-menus in turn comprise several menu items each which are displayed on the display for selection.

The selection of a menu item both in the main menu and in the sub-menus is done by means of an operating unit which is generally provided as a so-called rotary/push button. By rotating the rotary/push button, a selection mark or cursor may be moved from one menu item to the next, and the activation, i.e. the selection of a menu item, is carried out by pushing the rotary/push button.

For speeding up navigation within the option menus, a so-called hard key (push button switch) is often provided which allows to jump from any menu level to the main menu.

If the user of the in-car computer system intends to jump from a sub-menu assigned to a main menu item to another main menu item, the user has to push for example the hard key to jump back to the main menu, has to turn the rotary/push button until the cursor is on the desired main menu item, so that finally by pushing the rotary/push button the main menu item is activated and the underlying sub-menu item is reached.

Although the operation as described above is reliable in general, there is a demand to further increase the ergonomics of an in-car computer system and to enhance the man-machine interface.

SUMMARY OF THE INVENTION

The object of the present invention is, hence, to provide an in-car computer system which allows a simpler and more ergonomic operation.

This object is solved by an in-car computer system of the aforementioned kind which is provided with a switching member, its repeated operation causing the control device to activate the individual menu items of the main menu in a predetermined order.

In other words, the function of jumping back to the main menu, moving the cursor onto a menu item of the main menu and activating this menu item, in order to reach the sub-menu level lying below, is achieved solely by operating the switching member. Each further operation of the switching member hereby activates the next main menu item. Hence, by repeated operation of the switching member, the menu items of the sub-menus may be displayed consecutively on the monitor, whereas after reaching the last menu item, it is jumped back again to the first menu item. The individual sub-menu items of the respective displayed sub-menu may then be selected and activated by means of the operating unit in a known manner.

Hence, it is apparent that this switching member allows a significant simplification of the operation of the in-car computer system. Particularly, the user may navigate to the desired sub-menu items with reduced view contact to the monitor.

It is preferred to provide the operating unit as a rotary/push button and to provide a further switching member which allows switching back to the main menu. In other words, by operating this further switching member, the menu items of the main menu may be displayed on the screen of the in-car computer system, regardless which of the menus or menu items were selected before.

However, it is to be noted that the operating unit may also be provided as a so-called four-way rocker switch or four-way arrow button. Compared with the rotary/push button, this kind of operating unit has one additional degree of freedom (left/right switch) which allows to assign a further function (e.g. jump-back function) to the operating unit and hence to avoid e.g. a hard key.

According to a further preferred embodiment, an evaluation device is provided which registers the selection of menu items of the main menu and determines a frequency value for each menu item.

In other words, the evaluation device registers which sub-menu items, preferably those of the level directly following the main menu level, that are selected by the user. These frequency values are then preferably used to determine the order of the main menu items in which they are activated by operating the switching member. To speed up navigation, it would be possible to consecutively display the most frequently used menu items on the monitor by operating the switching member each time the navigation is newly started (new navigation). For the in-car computer system, a "new navigation" for example is assumed if a sub-menu item has been selected and activated by means of the control unit before operation of the switching member.

Of course it is also possible that the order of activating the main menu items by means of operating the switching member is freely adjustable.

This measure has the advantage that an adaptation to the preferences of the user would be possible.

A further adaptation of the in-car computer system may be seen in a restriction of the main menu items reachable for the user via the switching member to those which are most important for the user.

This measure would also support an improved adaptation.

The object underlying the present invention is also solved by a method for selecting and activating option menus in an in-car computer system, wherein by activating a switching member the main menu items may be selected and activated one after the other.

This method has the advantages already described in connection with the in-car computer system described above; it is therefore referred thereto as to avoid repetitions.

It is preferred that the order of selecting and activating the main menu items may be adjusted by operating the switching member. More preferably, the order may be determined according to the frequency of the used main menu items.

It is further preferred to start the order with respect to the selection and activation of the main menu items from the beginning after operating the switching member and the following selection and activation of a sub-menu item.

Further features and advantages can be taken from the following description and the enclosed drawings.

It is to be noted that the features mentioned above and those yet to be explained below can be used not only in the respective combinations indicated, but also in other combinations or in isolation, without leaving the scope of the present invention.

BRIEF DESCRIPTION OF THE DRAWINGS

Illustrative embodiments of the invention are shown in the drawings and will be explained in more detail in the description below with reference to same. In the drawings;

FIG. 1. is a schematic view of the structure of option menus;

FIG. 2 is a schematic block diagram of an in-car computer system in a very simplified form; and FIG. 3 shows a table for illustrating the method according to the present invention.

DETAILED DESCRIPTION OF A PREFERRED EMBODIMENT

In FIG. 2, an in-car computer system is schematically shown and referenced with reference numeral 10. The in-car computer system 10 comprises a control device 12, which may, for example, be provided as a personal computer (PC) specifically adapted to the conditions in a vehicle.

The control device 12 is coupled with a driver unit 14 which provides driver signals to a monitor 16. The monitor 16 is generally located in the dashboard and hence within line-of-sight of the driver.

For operating the in-car computer system, a so-called rotary/push button 18 and a switching member 20 in form the of the push button switch are provided in the present embodiment.

Further, a memory 22 as well as an evaluation device 24 are provided and coupled with the control device 12. The function of both will be explained below.

The in-car computer system 10 allows to operate and control different components within a vehicle, for example an audio component, comprising radio, compact disc and tape recorder, a navigation component with route calculation, telematic services, etc., a telephone- and Internet component or an air conditioning component, just as to mention few of them. These components are schematically shown in FIG. 2 and referenced with reference numerals 30a, 30b, 30c. The activation of these components is achieved most favorably via a bus system which is indicated with reference numeral 32 in FIG. 2. The bus system may, for example, be a so-called CAN-bus system.

The operation of the components may be achieved solely by operation of the rotary/push button 18, which allows to select and activate option menus displayed on the monitor 16. The option menus being available are stored in the memory 22 and may be read and transmitted by the control device 12 via the driver unit 14 to the monitor 16 for display.

The structure of the option menus is schematically shown in FIG. 1. The hierarchical structure is clearly shown and is divided into plural levels, so-called menu levels or just menus. The highest menu level forms the main menu which contains four main menu items HM1–HM4 in the present embodiment just as one example. Each main menu item HM1–HM4 may, for example, represent one of the components 30 to be operated.

The next menu level forms the sub-menu 1 which in the present case contains seven menu items, wherein the sub-menu items 1, 2 are assigned to the first main menu HM1, the menu items 3, 4 to the second main menu item HM2, the menu items 5, 6 to the third main menu item HM3 and the menu item 7 to the main menu item HM4. Further sub-menu levels (in the present case only sub-menu level 2) may follow the sub-menu level 1.

If the user for example wants to activate a menu item 34 of sub-menu level 2, he first has to select and activate menu item HM1 in the main menu level. As a result, the subordinated menu items 1, 2 of the sub-menu 1 are displayed on the monitor 16. By means of the rotary/push button 18, the user selects now menu item 1 and activates it by pushing the rotary/push button so that both menu items 34 and 36 are now displayed for selection on the monitor 16. The user then again rotates the rotary/push button in order to move the cursor to menu item 34 and subsequently pushes the rotary/push button 18 to activate menu item 34.

For simplifying navigation within these option menus, the switching member 20 is provided, its operation causing the control device 12 to select and activate consecutively the main menu items HM1–HM4 with each operation. In other words, the sub-menu items 1, 2 of sub-menu 1, then sub-menu items 3, 4, then sub-menu items 5, 6, and finally sub-menu item 7 are displayed on the monitor 16 one after the other. After having operated the switching member 20 four times, the order starts again at the beginning with main menu HM1 and hence the display of sub-menu items 1, 2.

In FIG. 3, it is illustrated in the second row of the shown table, which sub-menu items are displayed on the monitor 16 when operating the switching member 20.

The switching member 20 hence unifies plural operations (which were necessary in prior systems) in one element, namely first the selection of a main menu item by rotating the rotary/push button 18 and second the activation of the selected menu item by pushing the rotary/push button 18. The selection of main menu items HM1–HM4 is achieved on the basis of a fixed predetermined order in the most simplified case, in the present embodiment the order HM1, HM2, HM3, HM4.

However, it would also be possible that the user determines this order by himself and stores it in the memory 22. Such an individual order is, for example, illustrated in the fourth row of the table shown in FIG. 3.

Besides this rather static determination of the order, it is also possible that the order may be determined dynamically by the control device 12. One criterion for determining the order would, for example, be the frequency of selection of specific main menu items. For this purpose, the in-car computer system 10 comprises the evaluation device 24, which registers and stores the selection and activation of menu items of sub-menu 1, calculates and stores a frequency value in response thereto and assigns this value to the corresponding main menu items HM1–HM4. In other words, a high frequency value is, for example, assigned to main menu item HM1 if the user very often selects and activates the menu items 1 and 2 of sub-menu 1.

The order determined by the control device 12 of the selected and activated main menu items HM1–HM4 upon operation of the switching member 20 may then be carried out on the basis of these frequency values.

With all three mentioned possibilities of determining the order, the determined order is always kept to, i.e. each operation of the switching member 20 causes the control device to jump to the main menu item which is the next according to the corresponding order. If the end of the order is achieved, it is jumped back to the first element of the order. Hence, it is not of importance whether further sub-menu items have been activated in the meantime or a larger period between two succeeding operations of the switching member 20.

As an alternative, it is also possible that the order starts again at the beginning if one of the menu items of the sub-menu 1 is selected after operating the switching member 20. In other words, with a standard order and after two operations of the switching member 20 and selection and activation of one of both menu items 3, 4, both menu items 1, 2 of the sub-menu 1 are displayed on the monitor 16 upon the next operation of the switching member 20 (hence, the order of the main menu items starts from the beginning again).

Beside this criterion, it would also be possible to use the time period between succeeding operations of the switching member 20 as a further criterion. If the time period for example exceeds a predetermined value, the order may start from the beginning again.

In view of the above, it is apparent that providing an additional switching member 20 results in a significant simplification of the navigation within option menus. The user is able to navigate to desired sub-menu items with fewer operation activities.

What is claimed:

1. An in-car computer system comprising:
    a control device having a display for displaying a plurality of hierarchically arranged menus comprising a main menu having plural items and plural sub-menus, with each sub-menu containing at least one selectable menu item,
    an operating unit for selecting and activating a menu item within the main menu or one of said sub-menus when said menu item is displayed on said display, and
    a switching member, its repeated actuation causing the control device to activate the individual menu items of only the main menu in a predetermined order.

2. The in-car computer system of claim 1, wherein the operating unit is a rotary/push button.

3. The in-car computer system of claim 1, wherein an evaluation device is provided which registers the activation of menu items of the main menu and determines a frequency value for each menu item.

4. The in-car computer system of claim 3, wherein said control device determines the order according to the frequency values.

5. The in-car computer system of claim 1, wherein the order of menu item's activation is adjustable.

6. The in-car computer system of claim 1, wherein the menu items intended for being displayed are selectable.

7. The in-car computer system of claim 1 wherein the display for each main menu item comprises one or more first sub-menu items and the display for each of said first sub-menu items comprises one or more second sub-menu items.

8. The in-car computer system of claim 1 wherein initial actuation of said switching member causes the display of said control device to display the first sub-menu items associated with a first predetermined one of said main menu items.

9. The in-car computer system of claim 8 wherein a second consecutive actuation of said switching member causes the display of said control device to display the first sub-menu items associated with a second predetermined one of said main menu items.

10. The in-car computer system of claim 1 wherein actuation of the switching member activates the main menu items regardless of the particular menu being displayed when the switching member is actuated.

11. A method for selecting and activating menu items from a plurality of hierarchically arranged menus displayed on the display of an in-car computer system, the plurality of menus comprising a main menu with at least two main menu items and at least a sub-menu with at least two sub-menu items, wherein by actuating a switching member the main menu items only are selected and activated consecutively, regardless of the particular menu being displayed when said switching member is initially actuated.

12. The method of claim 11, wherein said order of selection and activation of the main menu items is adjustable by actuating the switching member.

13. The method of claim 12, wherein said order is determined according to a frequency value of the main menu items used.

14. The method of claim 11, wherein after actuating the switching member and selecting and activating a sub-menu item said order starts again from the beginning with respect to selection and activation of the main menu items.

* * * * *